UNITED STATES PATENT OFFICE.

GEORGE F. WILSON, OF EAST PROVIDENCE, AND CHARLES A. CATLIN, OF PROVIDENCE, RHODE ISLAND.

PREPARATION OF POTASSIUM PHOSPHATE FOR BAKING-POWDER.

SPECIFICATION forming part of Letters Patent No. 229,573, dated July 6, 1880.

Application filed February 27, 1879.

*To all whom it may concern:*

Be it known that we, GEORGE F. WILSON, of East Providence, and CHARLES A. CATLIN, of Providence, Rhode Island, have invented a new and useful Improvement in Cream-of-Tartar Substitutes, (acid phosphate-of-potassium compound,) which improvement is fully set forth in the following specification.

The invention relates to the preparation of acid phosphate-of-potassium compounds or cream-of-tartar substitutes for use in bread-making and other arts; and it consists in an acid powder or cream-of-tartar substitute in which the active ingredient is an acid phosphate of potassium having an excess of base over a dihydrogen potassic phosphate, and in which both the acid phosphate and any sulphate of lime present are hydrated.

It also consists in the process of making the said acid powder by acting upon tricalcic phosphate with dilute oil of vitriol (sulphuric acid) so as to form a solution of hydrogen dicalcic phosphate, and then causing a double decomposition of the calcic phosphate with potassium sulphate, the reactions being assisted by agitation and heat.

The method of proceeding is varied somewhat, according to the quality of the article we wish to produce. In one case all the lime of the tricalcic phosphate from which the phosphoric acid is obtained is retained, in another only a portion thereof, and in a third it is removed so far as practicable.

To obtain a product retaining all the lime of the tricalcic phosphate used in its preparation we proceed as follows: In a suitable tank provided with an agitator and steam-coil, or other means of continuously heating the contents, we place a determined quantity of dilute oil of vitriol from which the lead has been removed—say three hundred and fifty pounds at 1.19° Baumé specific gravity—set the agitator in motion, and apply heat. We now add gradually a quantity of finely-powdered white bone-ash, sufficient to produce, when acted upon by the oil of vitriol, a dihydrogen calcic phosphate in solution—say about one hundred and nine pounds of the bone-ash. This mixture we keep in motion and at a boiling, or nearly boiling, temperature for from seven to ten hours, at which time, under ordinary circumstances, the decomposition will have been completed. We now add, in dry powder or in solution in water, sulphate of potassium in quantity sufficient to replace the lime of the dihydrogen calcic phosphate with potassa—say about thirty pounds sulphate of potassium—and continue the boiling and agitation of the mass from seven to ten hours longer, when the double decomposition of the dihydrogen calcic phosphate and the sulphate of potassium will have taken place. The thick fluid or semi-fluid mass is now drawn off into crystallizing-vats, and allowed to remain until the mass has set or assumed a pasty solid condition, when it is spread upon the floor or other convenient place to dry. When nearly dry the process of desiccation is completed in a current of dry air, heated or not, as the case may be. If heated, a temperature greater than 120° Fahrenheit must be avoided.

In order to retain only a portion of the lime of the tricalcic phosphate, the solution of hydrogen dicalcic phosphate, obtained as before described, is filtered to separate as far as possible the sulphate of lime, and this liquor being boiled, the requisite quantity of potassium sulphate (as ascertained by the hydrometer or other means) is added. The mass is not allowed to cool at once, but the heating is continued till the mass becomes homogeneous and presents the appearance of boiled starch. The mass is then cooled and mixed with starch in the proportion of two to two and one-half times the weight of sulphate of potassium used. The operation is completed by exposure on trays and drying, as before described.

To produce the acid powder comparatively free from sulphate of lime, the hydrogen dicalcic phosphate is formed, and decomposed by potassium sulphate, substantially as first described. The solution is then filtered and concentrated to the crystallizing-point, and the mass, when cold, is mixed with starch or other diluent, and the preparation of the powder completed by exposure, drying, and pulverizing.

In effecting the conversion of the tricalcic phosphate a weak solution of acid phosphate of potassium, obtained from previous operations by washing the separated sulphate of lime with hot water, may be mixed with the oil of vitriol, and the time should, when necessary, be continued longer than indicated, to increase the decomposition of all the tricalcic phosphate.

The acid powder produced by the methods above described is mixed with an alkaline carbonate or bicarbonate to form baking-powder; or it may be used in connection with carbonates in bread-making. It may also be substituted for cream of tartar in other culinary processes, or for similar purposes.

In the three above-described methods of procedure it will appear that all depend upon the double reaction between the dihydrogen calcic phosphate and the potassium sulphate, and that in all the fluid mass obtained is converted into a dry powder for use. The acid powder obtained by any of the modifications contains as the active ingredient substantially a hydrogen dipotassic phosphate, and the sulphate of lime present, of which there is more or less, even when effort is made to remove it as far as possible, is, as well as the phosphate, in a completely hydrated condition.

We do not confine ourselves to the exact weights and proportions here given, for we are aware that they may be slightly varied without materially affecting the result; nor do we confine ourselves to following the steps of the process in the exact order here laid down, as, for instance, the sulphate may be added at the outset and the process of decomposition and substitution of bases proceed at the same time.

Having thus described our said invention and the manner in which the same is or may be carried into effect, what we claim, and desire to secure by Letters Patent, is—

1. An acid powder or cream-of-tartar substitute containing as the active ingredient an acid potassium phosphate with an excess of base over a dihydrogen potassic phosphate, and having both the acid phosphate and the sulphate of lime present completely hydrated, substantially as described.

2. The process of making an acid powder or cream-of-tartar substitute by treating tricalcic phosphate with dilute oil of vitriol under agitation and heat, as explained, decomposing the hydrogen dicalcic phosphate formed into hydrogen dipotassic phosphate with potassium sulphate, and converting the fluid or semi-fluid mass into a dry powder, substantially as described, so that in the resulting product the phosphate compounds and the sulphate of lime present are both completely hydrated, as set forth.

In testimony whereof we have signed this specification in the presence of two subscribing witnesses.

GEO. F. WILSON.
    CHAS. A. CATLIN.

Witnesses to Geo. F. Wilson's signature:
 E. A. DICK,
 C. J. HEDRICK.

Witnesses to Charles A. Catlin's signature:
 PHILIP O'REILY,
 G. M. CARPENTER, Jr.